United States Patent
Watanabe

(10) Patent No.: US 10,815,801 B2
(45) Date of Patent: Oct. 27, 2020

(54) TURBINE NOZZLE

(71) Applicant: IHI Corporation, Koto-ku (JP)

(72) Inventor: Fumiaki Watanabe, Tokyo (JP)

(73) Assignee: IHI Corporation, Koto-ku (JP)

( * ) Notice: Subject to any disclaimer, the term of this patent is extended or adjusted under 35 U.S.C. 154(b) by 64 days.

(21) Appl. No.: 16/123,820

(22) Filed: Sep. 6, 2018

(65) Prior Publication Data

US 2019/0010815 A1    Jan. 10, 2019

Related U.S. Application Data

(63) Continuation of application No. PCT/JP2016/080707, filed on Oct. 17, 2016.

(30) Foreign Application Priority Data

Mar. 11, 2016    (JP) .................... 2016-048157

(51) Int. Cl.
| | |
|---|---|
| *F01D 9/04* | (2006.01) |
| *F02C 7/28* | (2006.01) |
| *F01D 25/24* | (2006.01) |
| *F01D 11/00* | (2006.01) |
| *F01D 9/02* | (2006.01) |

(52) U.S. Cl.
CPC ............ *F01D 9/041* (2013.01); *F01D 9/02* (2013.01); *F01D 9/04* (2013.01); *F01D 11/00* (2013.01); *F01D 11/005* (2013.01); *F01D 25/24* (2013.01); *F02C 7/28* (2013.01); *F05D 2240/128* (2013.01); *F05D 2300/6033* (2013.01)

(58) Field of Classification Search
CPC ... F01D 9/02; F01D 9/04; F01D 9/041; F01D 11/00; F01D 11/005; F02C 7/28
See application file for complete search history.

(56) References Cited

U.S. PATENT DOCUMENTS

| | | | |
|---|---|---|---|
| 5,131,808 | A | 7/1992 | Ciais et al. |
| 6,217,282 | B1 | 4/2001 | Stanka |

(Continued)

FOREIGN PATENT DOCUMENTS

| | | |
|---|---|---|
| CA | 2031085 | 7/1991 |
| CA | 2 945 602 A1 | 1/2016 |

(Continued)

OTHER PUBLICATIONS

Russian Office Action and Search Report dated Jun. 20, 2019, in Patent Application No. 2018135140/06, 13 pages (with unedited computer generated English translation).

(Continued)

*Primary Examiner* — J. Todd Newton
*Assistant Examiner* — Sabbir Hasan
(74) *Attorney, Agent, or Firm* — Oblon, McClelland, Maier & Neustadt, L.L.P.

(57) ABSTRACT

A tapered surface section is formed on an inner surface of a base facing a flow path in an outer band section or inner band section of a turbine stator vane of one of two vane segments disposed adjacent to each other with a space therebetween, the turbine stator vane being formed of a ceramic matrix composite. The tapered surface section has a tapered shape which approaches an outer surface as extending toward the tip (i.e., toward an end face) of the base.

16 Claims, 9 Drawing Sheets

(56) References Cited

U.S. PATENT DOCUMENTS

| | | | |
|---|---|---|---|
| 6,503,051 B2* | 1/2003 | Predmore | F01D 11/005 |
| | | | 277/312 |
| 9,518,472 B2* | 12/2016 | Belmonte | F01D 9/042 |
| 2002/0094268 A1 | 7/2002 | Sugishita et al. | |
| 2008/0298956 A1 | 12/2008 | Eastman et al. | |
| 2010/0028135 A1 | 2/2010 | Hunt et al. | |
| 2012/0039716 A1 | 2/2012 | Ahmad et al. | |
| 2012/0055609 A1 | 3/2012 | Blanchard et al. | |
| 2014/0252765 A1 | 9/2014 | Branchet-Cohen et al. | |
| 2017/0009593 A1 | 1/2017 | Watanabe | |

FOREIGN PATENT DOCUMENTS

| | | |
|---|---|---|
| CN | 103649469 A | 3/2014 |
| EP | 1 643 081 A2 | 4/2006 |
| EP | 2 586 993 A2 | 5/2013 |
| JP | 3-33403 | 2/1991 |
| JP | 4-214932 | 8/1992 |
| JP | 4-232306 | 8/1992 |
| JP | 9-133664 | 5/1997 |
| JP | 11-107704 | 4/1999 |
| JP | 2001-20705 | 1/2001 |
| JP | 2002-213207 A | 7/2002 |
| JP | 2005-179106 | 7/2005 |
| JP | 2008-303874 | 12/2008 |
| JP | 2008-309564 | 12/2008 |
| JP | 2009-203947 | 9/2009 |
| JP | 2010-38165 | 2/2010 |
| JP | 2012-78322 | 4/2012 |
| JP | 2012-515869 | 7/2012 |
| JP | 2012-211826 | 11/2012 |
| JP | 2014-72119 | 4/2014 |
| JP | 2015-501405 | 1/2015 |
| JP | 2016-20643 | 2/2016 |
| RU | 2 523 308 C2 | 7/2014 |

OTHER PUBLICATIONS

International Search Report dated Dec. 27, 2016 in PCT/JP2016/080707, filed on Oct. 17, 2016.

Written Opinion dated Dec. 27, 2016 in PCT/JP2016/080707, filed on Oct. 17, 2016.

Canadian Office Action dated Sep. 30, 2019, in Patent Application No. 3,016,682, 4 pages.

Extended European Search Report dated Nov. 7, 2019 in European Patent Application No. 16893581.5, 7 pages.

Japanese Office Action dated Oct. 15, 2019 in Japanese Patent Application No. 2016-048157, 2 pages.

Combined Chinese Office Action and Search Report dated Mar. 4, 2020 in Patent Application No. 201680083273.4 (with English translation of Categories of Cited Documents), 7 pages.

* cited by examiner

TURBINE NOZZLE

CROSS REFERENCE TO RELATED APPLICATIONS

This application is a continuation application of International Application No. PCT/JP2016/080707, filed on Oct. 17, 2016, which claims priority to Japanese Patent Application No. 2016-048157, filed on Mar. 11, 2016, the entire contents of which are incorporated by reference herein.

BACKGROUND

1. Technical Field

The present disclosure relates to a turbine nozzle of a gas turbine.

2. Description of the Related Art

An axial-flow gas turbine includes turbine blades constituted of rotor blades (blades) and turbine nozzles constituted of stator vanes (vanes). The turbine blades and the turbine nozzles are disposed alternately in the axial direction of a rotary shaft. The turbine nozzle is formed from a plurality of stator vane segments (vane segments) circularly disposed, and each vane segment includes a plurality of turbine stator vanes.

Each vane segment includes a band section which is the base member of an end wall. A seal member is installed between adjacent two vane segments, in other words between adjacent two band sections (see Japanese Patent Application Laid-Open Publication No. 2009-203947). The seal member prevents the main flow of gas from leaking from between adjacent two band sections.

SUMMARY

A gas turbine is used under high-temperature environments. Therefore, a metal having a high heat-resistance has been conventionally used for a turbine blade and a turbine nozzle. Recently, the use of a ceramic matrix composite (hereinafter, referred to as a "CMC") has been studied. This is because the CMC has a high heat resistance and is lighter than metal. In particular, even when a planar CMC is bent to form a turbine stator vane, a fiber formed of a CMC will not be cut off. Accordingly, a high strength can be assured although the planar CMC is light.

On the other hand, in a case where a turbine stator vane is formed of a CMC, the strength expected for a turbine stator vane formed of the CMC needs to be maintained by preventing the fiber from being cut off and the continuity from being lost, in plugging a space between band sections with a seal member.

The present disclosure has been made in view of the above-described circumstances. The purpose of the present disclosure is to provide a turbine nozzle capable of appropriately plugging a space between the band sections of adjacent two turbine stator vanes without cutting off the fiber formed of a CMC when a turbine stator vane of a turbine nozzle in a gas turbine is formed of the CMC.

An aspect of the present disclosure is a turbine nozzle including: a plurality of turbine stator vanes each being formed by combining ceramics with a fiber fabric, an end of the turbine stator vane being bent and being integrally molded into a shape corresponding to an airfoil portion and to a band section connecting to the airfoil portion; and a flow path of gas between airfoil portions of adjacent two turbine stator vanes; a seal member extending across a bent section connecting to the airfoil portion of the band section of one turbine stator vane of the adjacent two turbine stator vanes, and a tip part of the band section, which is spaced from the bent section of the one turbine stator vane, of the other turbine stator vane of the adjacent two turbine stator vanes; and a thin-walled part formed in an inner surface facing the flow path of the band section of the other turbine stator vane, wherein a thickness between the inner surface of the band section and an outer surface opposite to the inner surface is, at a tip, thinner than the bent section.

A locking piece of the seal member may be swelled and formed in the outer surfaces of the both band sections, respectively, and the seal member may be abutted against the outer surfaces of the both band sections by inserting the seal member into a locking groove formed from the locking piece of the each band section and the outer surface, respectively.

The thin-walled part may be formed in a part corresponding to the blade width of the airfoil portion in the inner surface.

The thin-walled part may be formed from a tapered surface which approaches the outer-surface side as extending toward the tip of the band section.

The adjacent two turbine stator vanes may be two turbine stator vanes disposed adjacent to each other with the space therebetween among a plurality of turbine stator vanes of each of the two stator vane segments disposed adjacent to each other with the space therebetween, among a plurality of stator vane segments obtained by dividing the turbine nozzle into a plurality of parts.

According to the present disclosure, when a turbine stator vane of a turbine nozzle in a gas turbine is formed of a CMC, a space between the band sections of adjacent two turbine stator vanes can be appropriately plugged without cutting off the fiber formed of the CMC.

BRIEF DESCRIPTION OF THE DRAWINGS

FIG. 7A is a cross sectional view of an outer band section and FIG. 7B is a cross sectional view of an inner band section.

8A is a front view of the outer band section and FIG. 8B is a side view of the inner band section.

FIG. 9A is a cross sectional view of the outer band section and FIG. 9B is a cross sectional view of the inner band section.

FIG. 10A is a front view of the outer band section and FIG. 10B is a side view of the inner band section.

DESCRIPTION OF THE EMBODIMENTS

Figure 1:
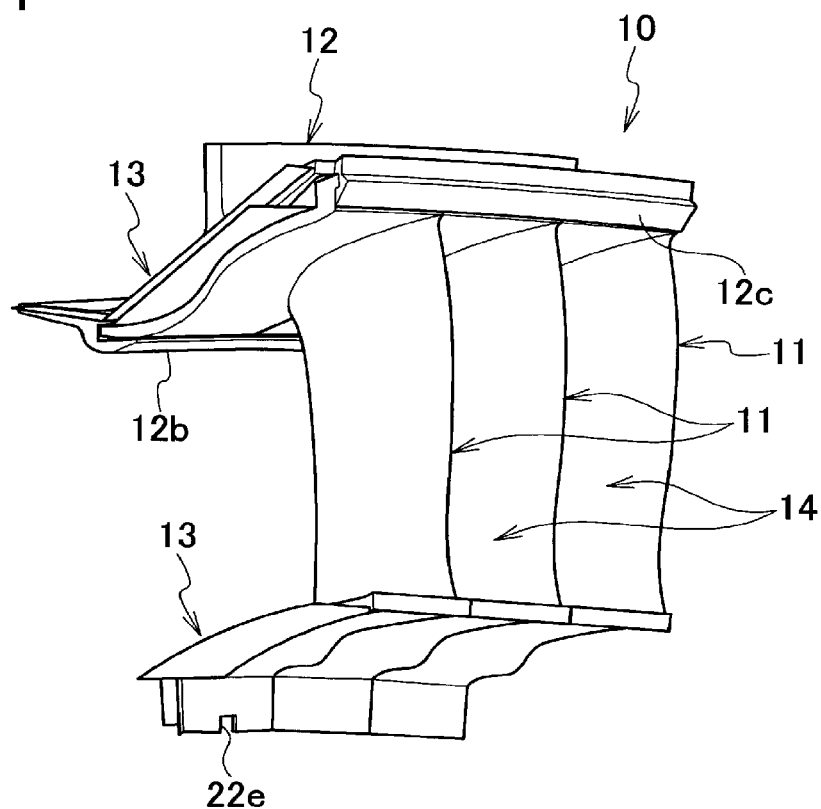
FIG. 1 is a perspective view of a vane segment constituting a turbine nozzle according to an embodiment of the present disclosure.
Figure 1:
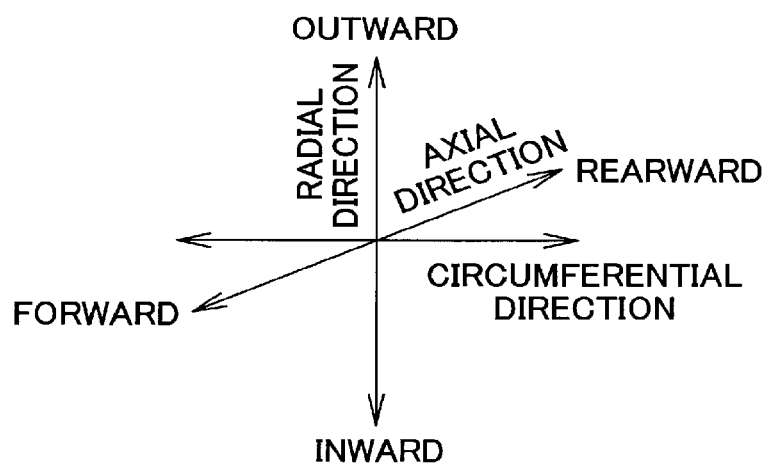

Hereinafter, the embodiments of the present disclosure will be described with reference to the accompanying drawings. FIG. 1 is a perspective view of a stator vane segment (vane segment) constituting a turbine nozzle according to an embodiment of the present disclosure.

Note that, in the present embodiment, a case will be taken as an example and described, in which the turbine nozzle is applied to a low pressure turbine constituting a jet engine. Moreover, in the following description, an upstream side of gas along the axial-center direction of the jet engine is referred to as forward and a downstream side of gas is referred to as rearward, the direction around the axial center is referred to as the circumferential direction, the direction perpendicular to the axial center is referred to as the radial direction, the axial-center side in this radial direction is referred to as the inner side, and the opposite side of the axial-center side is referred to as the outer side.

A vane segment 10 illustrated in FIG. 1 is obtained by dividing a turbine nozzle (stator vane) used for a low pressure turbine of a jet engine into a plurality of parts in the rotation direction (circumferential direction) of a non-illustrated turbine shaft. A plurality of vane segments 10 are circularly connected, thereby forming a low pressure turbine of a jet engine.

The vane segment 10 mainly includes a plurality of (in the present embodiment, three) turbine stator vanes 11, a hanger 12 (support member), and a plurality of seal members 13. Between the adjacent two turbine stator vanes 11, a flow path 14 through which gas passes is formed.

The turbine stator vane 11 is formed of a ceramic matrix composite (CMC). A fiber (reinforcing fiber) used for the CMC is, for example, a silicon carbide fiber, a carbon fiber, a silicon nitride fiber, an alumina fiber, or a boron nitride fiber. But the fiber may be a fiber formed of other appropriate ceramics, or of a mixture of two or more thereof.

For the turbine stator vane 11, a three-dimensional fabric is used, which is a fiber three-dimensionally woven in accordance with the thickness required for securing strength. For the turbine stator vane 11, a fabric formed by stacking a plurality of two-dimensional fabrics, or a fabric formed by stacking a plurality of two-dimensional fabrics and sewing together the same with a fiber may be used. The direction of fabrics is selected in consideration of the direction of a stress on the turbine stator vane 11.

The turbine stator vane 11 is manufactured by provisionally molding a sheet of fabric formed of a fiber, forming ceramics using the steps of impregnation, sintering, or the like, combining the ceramics with the fabric, and thereafter machining this combined one.

Figure 2:
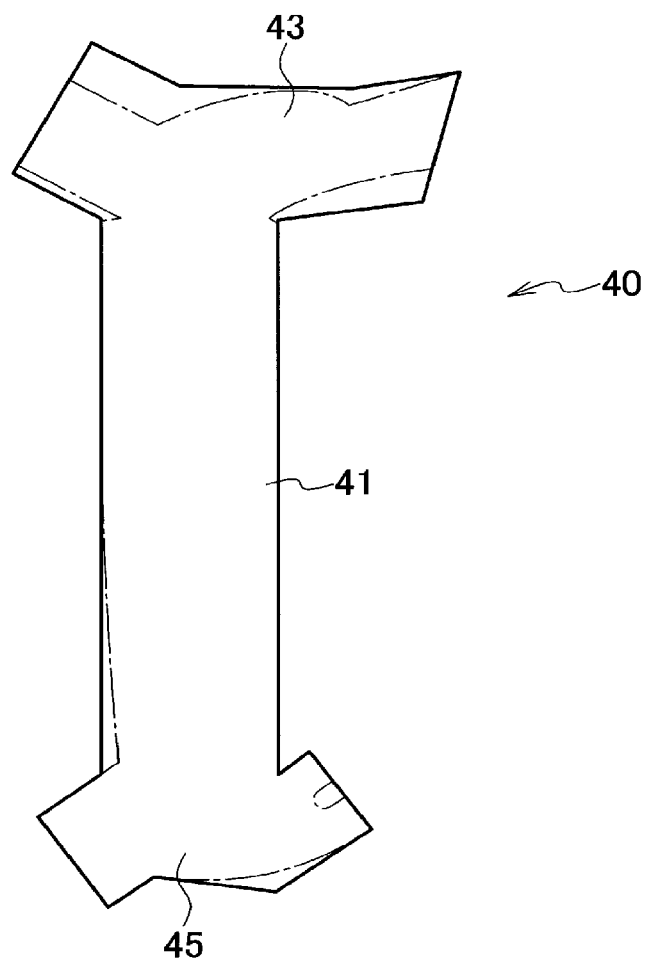
FIG. 2 is a plan view schematically illustrating an expanded state of a fiber fabric used for the turbine stator vane of FIG. 1.

FIG. 2 is a plan view schematically illustrating an expanded state of a fiber fabric used for the turbine stator vane 11 of FIG. 1. As illustrated in FIG. 2, the fiber fabric 40 is firstly cut into a shape corresponding to an original mold of the turbine stator vane 11. Cutting may be before forming ceramics, or may be thereafter.

That is, the fiber fabric 40 used for the turbine stator vane 11 is generally cut out so as to include a portion 41 to serve as an airfoil portion, a portion 43 to serve as an outer band section, and a portion 45 to serve as an inner band section. The portion 43 is to expand in the width direction from one end of the portion 41, while the portion 45 is to expand in the width direction from the other end of the part 41. However, based on deformation caused by bending the fabric or on a portion to be lost by machining in a subsequent step, an appropriate margin from a minimum required shape (in the view, indicated by a dashed-dotted line) is secured. Not to mention, the fiber is continuous across the entire fiber fabric 40.

Figure 3:
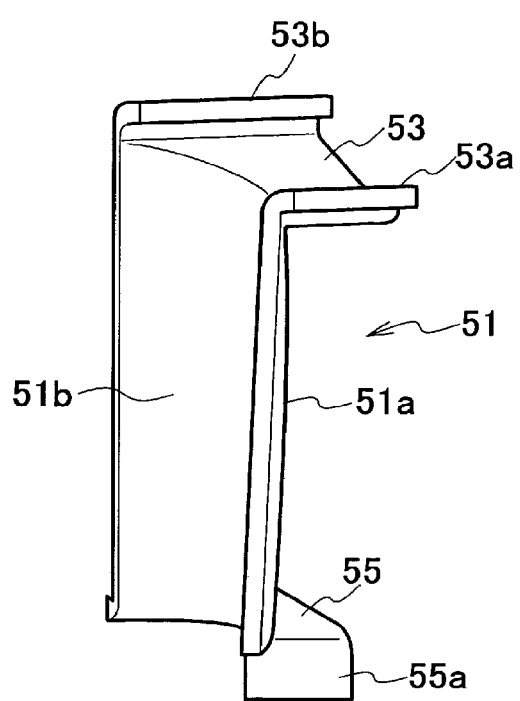
FIG. 3 is a perspective view illustrating a state in which the fiber fabric of FIG. 2 is bent and provisionally molded corresponding to the shape of the turbine stator vane.

As illustrated in a perspective view of FIG. 3, the fiber fabric 40 is provisionally molded, by bending, into a shape approximate to the turbine stator vane 11. Bending the fiber fabric 40 may be performed by fitting the fiber fabric 40 into a die and pressing the same, or may be performed using another method.

By bending and provisionally molding the fiber fabric 40 into a shape approximate to the turbine stator vane 11, the portion 41 to serve as the airfoil portion results in a curve section 51 which is almost straight in the longitudinal direction thereof and gently curved in the width direction thereof. Such a curve section 51 is approximated to the so-called airfoil shape, one surface 51a thereof being a convexly curved suction surface and another surface 51b thereof being a concavely curved pressure surface.

Moreover, the portion 43 to serve as the outer band section is bent substantially perpendicular to the curve section 51 to form as an outer bent section 53. The bending direction corresponds to the circumferential direction in the turbine nozzle. Furthermore, at one end 53a corresponding to a fore side in the axial direction and at another end 53b corresponding to a rear side in the axial direction, the curve section 51 is bent upward, respectively (to the radially outward of the turbine nozzle). The upwardly-bent end 53a is a portion to serve as a fore hook of the outer band section. The upwardly-bent end 53b is a portion to serve as an aft hook of the outer band section.

Similarly, the portion 45 to serve as the inner band section is bent substantially perpendicular to the curve section 51 to form as an inner-side bent section 55. The bending direction corresponds to the circumferential direction in the turbine nozzle. Furthermore, at an end 55a corresponding to the fore side in the axial direction, the portion 45 is bent downward (radially inward of the turbine nozzle). The downwardly bent end 55a is a portion to serve as a flange of the inner band section.

The fiber fabric 40 provisionally molded as described above is combined with a matrix formed of ceramics. As the method for forming the matrix, a known method can be employed. For example, the matrix can be impregnated into a fiber utilizing a chemical reaction with gas, or solid powder which is a precursor of ceramics may be formed into a slurry, this slurry may be impregnated into a fiber by pouring, and next the resulting fiber may be pyrolytically decomposed or sintered. Through such steps, a matrix formed of ceramics is produced and combined with the fiber fabric 40.

The ceramics combined with the fiber fabric 40 are machined into the turbine stator vane 11 as described below.

Figure 4:
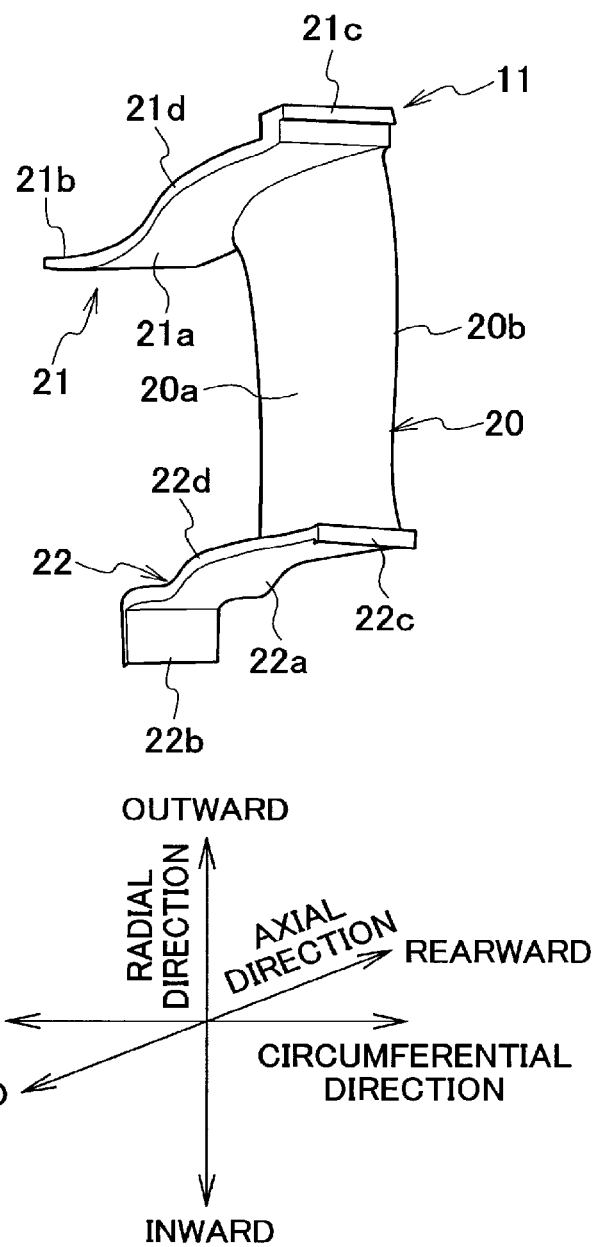
FIG. 4 is a perspective view of the turbine stator vane of FIG. 1 formed of a ceramic matrix composite which is formed by combining the temporarily-formed fiber fabric of FIG. 3 with ceramics.

First, the curve section 51 is machined into an airfoil portion 20 with the so-called airfoil shape which includes a suction surface 20a and pressure surface 20b as illustrated in a perspective view of FIG. 4.

Moreover, the outer bent section 53 of FIG. 3 is machined into a base 21a of an outer band section 21 as illustrated in FIG. 4. Both ends 53a and 53b of the outer bent section 53 of FIG. 3 are also machined into a fore hook 21b and an aft hook 21c, respectively.

Furthermore, the inner-side bent section 55 of FIG. 3 is machined into a base 22a of an inner band section 22 as illustrated in FIG. 4. The end 55a of the inner-side bent section 55 of FIG. 3 is machined into a flange 22b.

After the above-described machining, a single turbine stator vane 11 exhibits a substantially U-shape as a whole, as illustrated in FIG. 4. Then, the turbine stator vane 11 will include: the airfoil portion 20 extending in the radial direction in the circumferential direction of a non-illustrated turbine shaft; the outer band section 21 bending from an outer edge in the radial direction of the airfoil portion 20 toward the pressure surface 20b side of the airfoil portion 20 and extending toward a one side in the circumferential direction; and the inner band section 22 bending from an inner end in the radial direction of the airfoil portion 20 toward the pressure surface 20b side of the airfoil portion 20 and extending toward the one side in the circumferential direction.

The above-described outer band section 21 has a structure, in which the fore hook 21b at a front end extends tilting toward the outer side in the radial direction with respect to the base 21a forming a gas passage. Moreover, the aft hook 21c at a rear end of the outer band section 21 tilts toward the outer side in the radial direction with respect to the base 21a, and a tip part thereof projects toward the axial-center direction and an end face thereof is substantially S-shaped.

Moreover, the inner band section 22 has a structure, in which the flange 22b at a front end extends bending toward the inner side in the radial direction and a rear part 22c slightly projects toward the inner side in the radial direction, with respect to the base 22a forming the gas passage.

The end face 21d and 22d on the one side in the circumferential direction in the outer band section 21 and inner band section 22 have circular shapes fitted to the shape of the suction surface 20a of the airfoil portion 20. Thus, as illustrated in FIG. 1, in combining a plurality of turbine stator vanes 11 as the vane segment 10, the turbine stator vane 11 will closely contact to the outer band section 21 or inner band section 22 in the adjacent turbine stator vane 11 from the bent section side connecting to the airfoil portion 20. Then, brazening is applied to portions where the outer band sections 21 contact each other and the inner band sections 22 contact each other.

Figure 5:
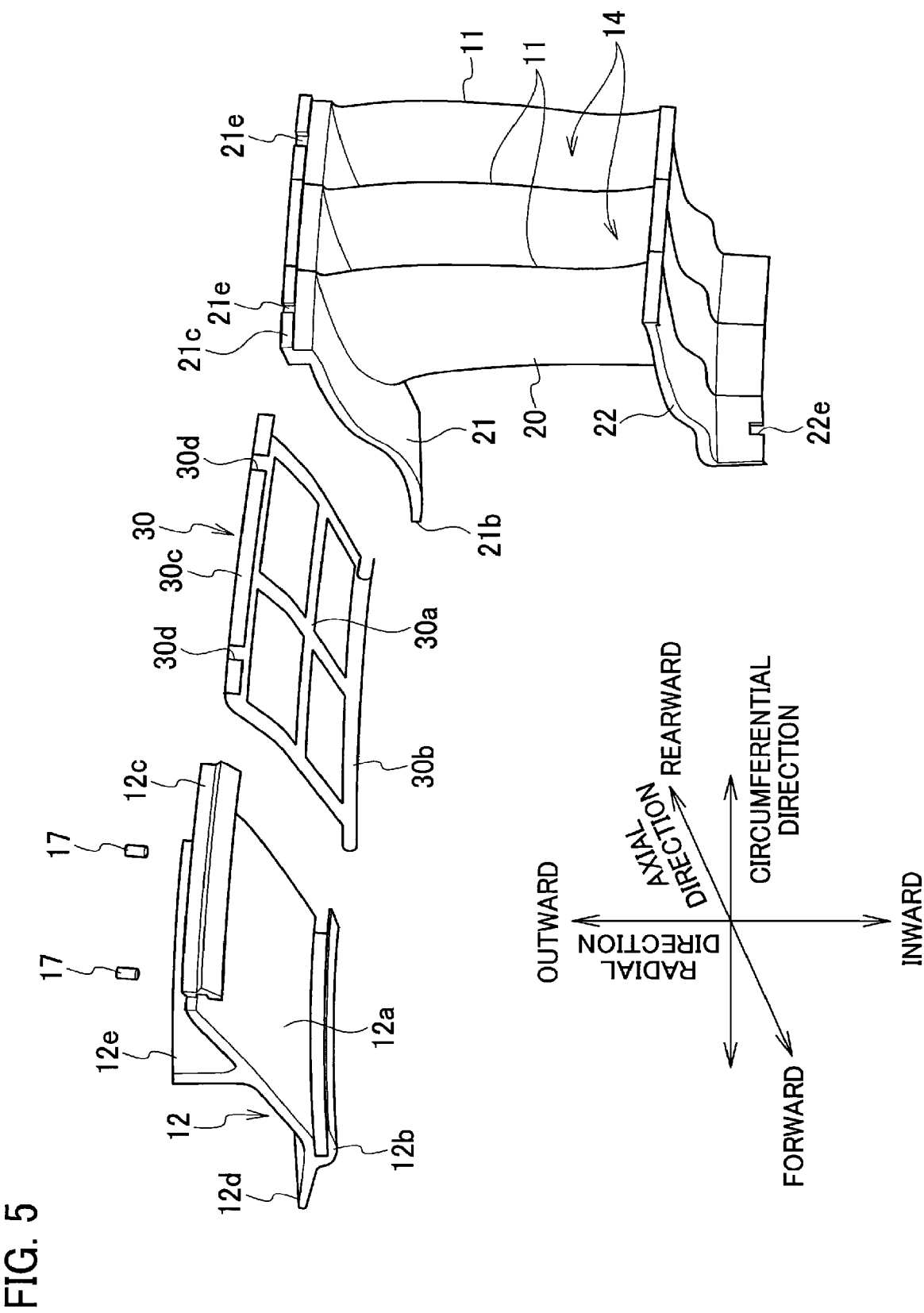
FIG. 5 is an exploded perspective view of the vane segment of FIG. 1 using the turbine stator vane of FIG. 4.

The hanger 12 illustrated in FIG. 1 is formed of a metallic material (e.g., a nickel alloy) As illustrated in FIG. 5, the hanger 12 is located on the outer side in the radial direction of the vane segment 10, and fixes the vane segment 10 to a non-illustrated turbine casing.

The hanger 12 includes a base 12a which covers the outer circumferential surface of the vane segment 10 while being spaced therefrom. A front lock 12b which locks the fore hook 21b of the outer band section 21 of each turbine stator vane 11 is formed on a fore side of the base 12a. Moreover, a rear lock 12c which locks the aft hook 21c of the outer band section 21 of each turbine stator vane 11 is formed on a rear side of the base 12a.

The rear lock 12b and fore hook 12c each have a groove shape which is opened toward the center in the axial-center direction on the inner surface side of the hanger 12, and are capable of locking the outer band section 21 to the hanger 12 by sliding, in the circumferential direction, the fore hook 21b of the outer band section 21 to the groove portion of the front lock 12b, and sliding, in the circumferential direction, the aft hook 21c of the outer band section 21 to the groove portion of the rear lock 12c.

Moreover, on the outer-surface side of the hanger 12, a front rim 12d extending diagonally-forward further from the front lock 12b and a rear rim 12e extended outward in the radial direction from the center portion in the axial-center direction are formed. A plurality of through-holes (not illustrated) are formed in the rear rim 12e.

The hanger 12 configured in this manner is attached to a turbine casing by abutting the tip part of the rear rim 12e against an attaching rib (not illustrated) of the turbine casing, superimposing a through-hole (not illustrated) formed in the attaching rib of the turbine casing onto a through-hole (not illustrated) of the rear rim 12e, and inserting a fixing pin (not illustrated) extending across both the through-holes into both the through-holes.

On the other hand, regarding the inner side in the radial direction of the vane segment 10, for example as illustrated in FIG. 1 a bifurcated cutout 22e formed at a tip of the flange 22b in the inner band section 22 of one (in FIG. 1, the turbine stator vane on the leftmost) of a plurality of turbine stator vanes 11 is used for fixing the vane segment 10.

That is, the flange 22b of the inner band section 22 is engaged with an engagement part of a support (not illustrated) on the axial-center side provided in a turbine casing (not illustrated), and then the cutout 22e of the flange 22b is fitted into a pin (not illustrated) extending through the engagement part. Thus, movement of the inner band section 22 in the circumferential direction of the vane segment 10 is restricted, and also movement of the inner band section 22 in the axial-center direction of the vane segment 10 is restricted by the pin (not illustrated) having the cutout 22e fitted thereinto.

The turbine nozzle can be configured basically by circularly interlinking one round of vane segments 10 described above. Accordingly, a space (space S illustrated in FIG. 7A and FIG. 7B) is produced between the adjacent two vane segments 10.

Then, in order to prevent the airtightness of the flow path 14 from being damaged by the space provided between both vane segments 10, a seal member 13 (see FIG. 1) for plugging this space is provided extending between the adjacent vane segments 10.

Figure 6:
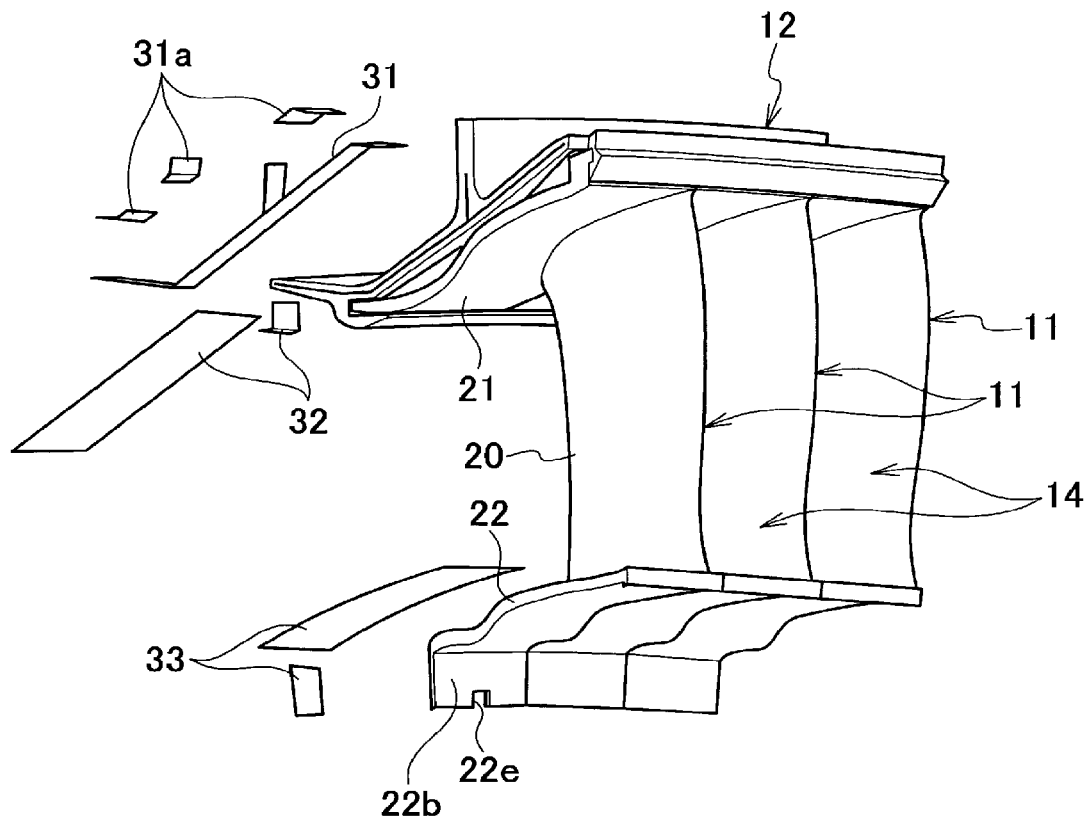
FIG. 6 is an exploded perspective view illustrating the components of a sealing section between the vane segments of FIG. 1.
Figure 6:
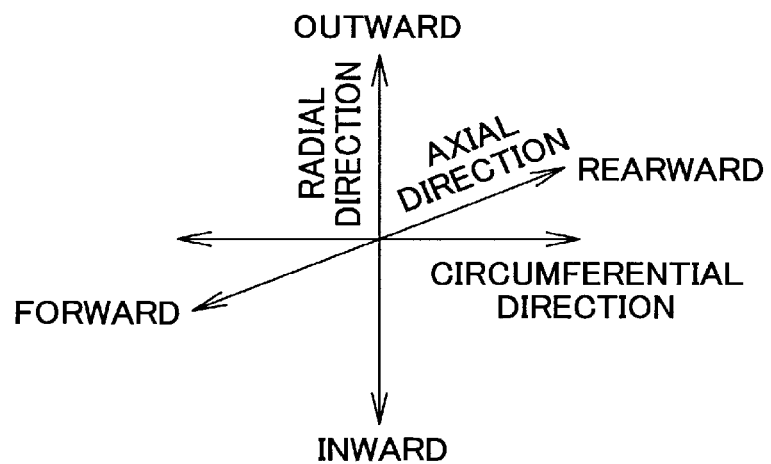

The seal member 13 according to the present embodiment includes a hook seal 30 illustrated in FIG. 5, and a hanger seal 31, outer seal 32, and inner seal 33 illustrated in an exploded perspective view of FIG. 6.

The hook seal 30 is interposed between the outer band section 21 and the hanger 12 of the turbine stator vane 11. The hook seal 30 seals a portion between the fore hook 21b and aft hook 21c of the outer band section 21 and the front lock 12b and rear locks 12c of the hanger 12.

A base 30a of the hook seal 30 includes four sides and a crisscross framework, where a fore side 30b and a rear side 30c are bent corresponding to the groove shape of the front lock 12b and rear lock 12c of the hanger 12, respectively.

A cutout 30d is formed at two places in the rear side 30c of the hook seal 30. Moreover, corresponding to the cutout 30d, a through-hole (not illustrated) is formed in the upper surface of the rear lock 12c of the hanger 12, and a cutout 21e is formed in the aft hook 21c of the outer band sections 21 of some (in FIG. 5, the turbine stator vanes 11 of both ends) of the turbine stator vanes 11. In each turbine stator vane 11 and the hook seal 30 of the vane segment 10, movement in the circumferential direction of the turbine shaft with respect to the hanger 12 is restricted by pins (not illustrated) inserted into these cutouts 30d, 21e and into the through-hole (not illustrated) of the hanger 12.

Note that, the space between the fore hook 21b and aft hook 21c of the outer band section 21 and the fore lock 12b and rear lock 12c of the hanger 12, the thickness of the hook seal 30, and the like are set, taking into consideration a difference in the thermal expansion between the turbine stator vane 11 formed of a CMC and the hanger 12 formed of a metallic material, so as to suppress a thermal stress on the turbine stator vane 11 and also prevent the leakage of gas in a high temperature state during operation of a jet engine.

The hanger seal 31, outer seal 32, and inner seal 33 illustrated in FIG. 6 seal a space between adjacent two vane segments 10. The hanger seal 31 is provided in a sealing groove formed in the end surface in the circumferential direction of the hanger 12. Moreover, an auxiliary seal 31a is stacked on a bent portion of the hanger seal 31.

The outer seal 32 is provided between the base 30a of the hook seal 30 and the radially-outer surface (i.e., below-mentioned outer surface) of the outer band section 21, and provided in the sealing groove formed in the end surface in the circumferential direction of the aft hook 21c of the outer band section 21. The inner seal 33 is provided in the radially-inner surface (i.e., below-mentioned outer surface) of the inner band section 22 and is provided in a groove formed in the end surface in the circumferential direction of the flange 22b of the inner band section 22.

The outer seal 32 and inner seal 33 extends between the turbine stator vanes 11 of two vane segments 10 which are disposed adjacent to each other with a space therebetween, and are abutted to the outer surface of the base 21a in the outer band section 21 and the outer surface of the base 22a in the inner band section 22 of each turbine stator vane 11, respectively.

Then, the outer seal 32 and inner seal 33 closely contacts to the outer surface of the base 21a of the outer band section 21 and the outer surface of the base 22a of the inner band section 22 respectively, due to a differential pressure between the inner side (flow path 14) and outer side of the turbine nozzle. Thus, the leakage of gas from a space between the outer band section 21 side and the inner band section 22 side is prevented.

In this manner, in the turbine nozzle in the present embodiment, the turbine stator vane 11 of the vane segment 10 includes the outer band section 21 and inner band section 22 constituting the flow path 14 which is the gas passage, and has a continuous U-shape as a whole, so that the turbine stator vane 11 can have a simple structure which can be formed using one sheet of fabric, and most of the gas passage can be formed of a CMC.

Furthermore, as illustrated in FIG. 5, effluence of gas from the flow path 14 can be prevented by providing the hook seal 30 in a space between the lock 12b and lock 12c of the hanger 12 and the fore hook 21b and aft hook 21c of the outer band section 21 and by proving the hanger seal 31, outer seal 32, and inner seal 33 illustrated in FIG. 6 between the vane segments 10.

It is not required to form locking grooves in the base 21a of the outer band section 21 and the base 22a of the inner band section 22, into which each of the hook seal 30, hanger seal 31, outer seal 32, or inner seal 33 of the seal member 13 is inserted and disposed therein. Therefore, the continuity of the fiber formed of a CMC in the base 21a or 22a is secured.

With this, the base 21a of the outer band section 21 and the base 22a of the inner band section 22, which constitute the flow path 14, can have a structure having the strength obtained by the CMC.

Incidentally, when the space provided between the adjacent vane segments 10 is plugged with the above-described outer seal 32 or inner seal 33, a dead space communicating with the flow path 14 is produced inside the outer seal 32 or inner seal 33. The main-flow gas passing through this dead space cannot obtain a designed speed at a nozzle exit, and causes a reduction in the efficiency of extracting a work (rotational force) at a rear rotor blade.

Figure 7A:
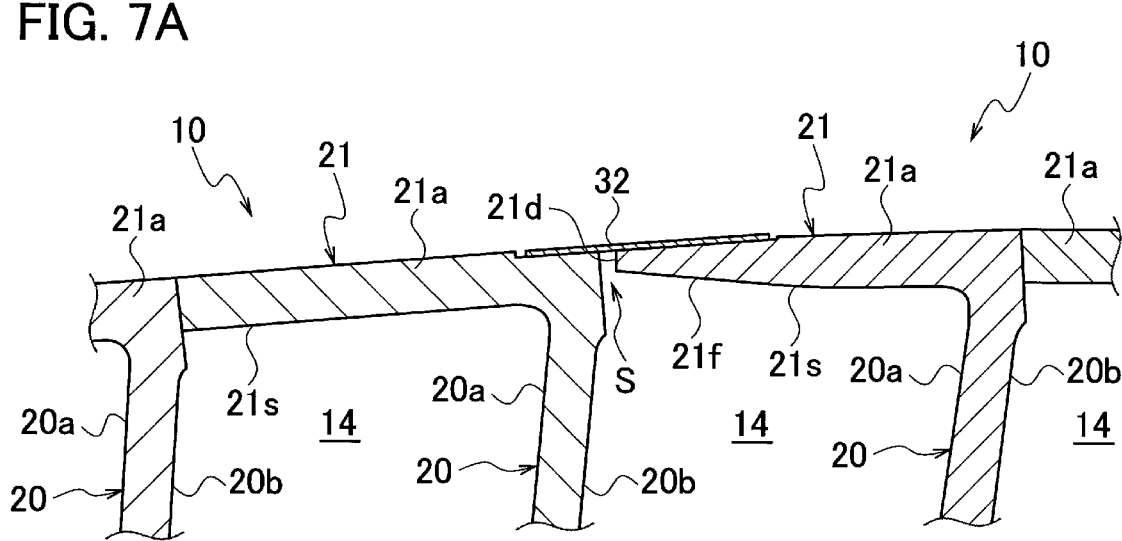
FIG. 7A and FIG. 7B illustrate an enlarged main portion of the sealing section between the vane segments of FIG. 1, where
Figure 7B:
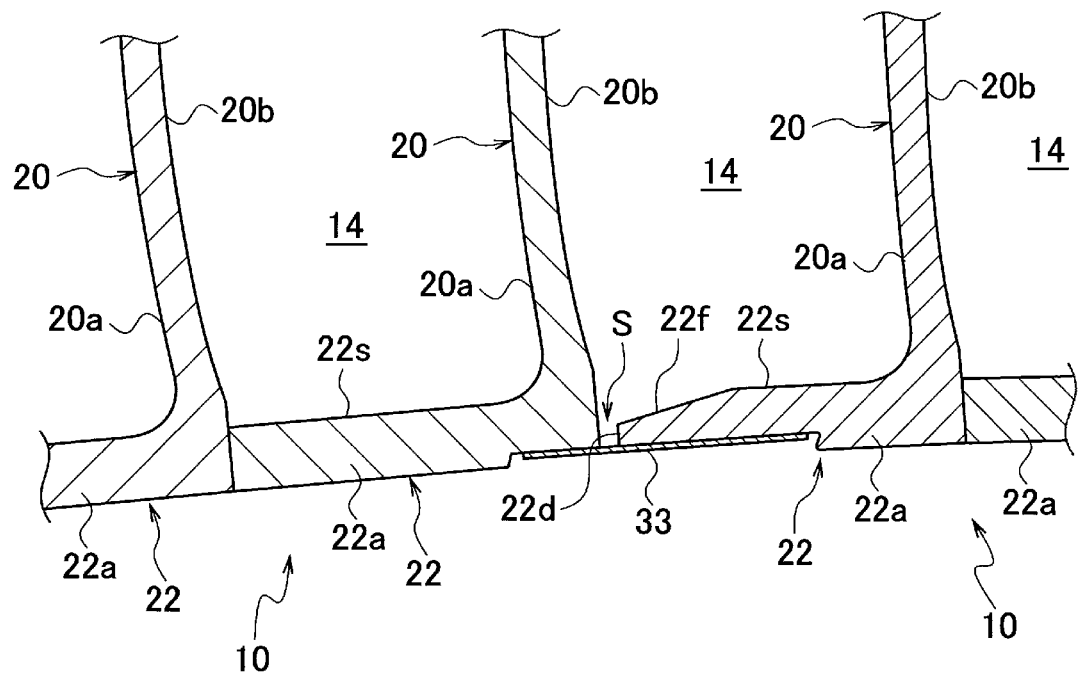

Then, in the turbine nozzle according to the present embodiment, as illustrated in the cross sectional views of FIG. 7A and FIG. 7B, a new design for reducing the above-described dead space has been applied to the outer band section 21 and inner band section 22 of one of the turbine stator vanes 11 of two vane segments 10 which are disposed adjacent to each other with the space S therebetween.

Here, when the space S is provided between the adjacent two vane segments 10, the bent section sides connecting to the airfoil portion 20 of the outer band section 21 and the inner band section 22 of the turbine stator vane (one of the turbine stator vanes) 11 located on the left side of the space S and the tip sides (i.e., end surfaces 21d and 22d) of the outer band section 21 and the inner band section 22 of the turbine stator vane (other turbine stator vane) 11 located on the right side of the space S are closely disposed without contacting each other.

Accordingly, a dead space connecting to the flow path 14 which is produced by plugging the space S between the adjacent vane segments 10 with the outer seal 32 or inner seal 33, has a depth corresponding to the thickness of the base 21a or 22a of the outer band section 21 or inner band section 22 of the turbine stator vane 11.

Then, in the present embodiment, a tapered surface section (thin-walled part or tapered surface) 21f or 22f is formed in the inner surface 21s or 22s facing the flow path 14 in the base 21a or 22a of the outer band section 21 or inner band section 22 of the turbine stator vane 11 located on the right side of the space S. This tapered surface section 21f or 22f is formed from a tapered surface which approaches outer surfaces as extending toward the tip (i.e., the end face 21d or 22d) of the base 21a or 22a.

Thus, the thickness of the base 21a or 22a of the outer band section 21 or inner band section 22 can be made thinner, in the end surface 21d or 22d, than the thickness of the bent section side connecting to the airfoil portion 20 so as to reduce the depth of the dead space connecting to the flow path 14, thereby preventing turbulence in the gas passing through the flow path 14 and suppressing a decrease in the turbine efficiency.

Moreover, a non-illustrated groove, into which a part of the outer seal 32 or inner seals 33 for plugging the space S is inserted, is formed in a portion closer to the inner surface 21s or 22s of the outer band section 21 or inner band section 22, so that the depth of the dead space can be reduced even without bringing the outer seal 32 or inner seal 33 closer to the flow path 14.

Therefore, it is possible to prevent a fiber from being cut off due to forming a groove, into which the outer seal 32 or inner seal 33 is inserted, in the outer band section 21 or inner band section 22, and thus prevent the strength of the outer band section 21 or inner band section 22 from decreasing.

Incidentally, the outer seal 32 or inner seal 33 is abutted against the outer surface of the portion where the tapered surface section 21*f* or 22*f* is formed in the inner surface 21*s* or 22*s* of the base 21*a* or 22*a*. Therefore, this portion can be reinforced with the outer seal 32 or inner seal 33 even if the thickness of the base 21*a* or 22*a* decreases. Accordingly, the portion where the tapered surface section 21*f* or 22*f* of the base 21*a* or 22*a* is formed will not cause a problem in strength.

Note that, in the turbine stator vane 11 according to the present embodiment, the outer band section 21 or inner band section 22 is formed with a size larger in the blade width direction than that of the airfoil portion 20. Therefore, if the tapered surface section 21*f* is formed in the base 21*a* of the outer band section 21 across the entire length in the blade width direction of the airfoil portion 20, then a gap at a position of the inner surface 21*s* due to the presence or absence of the tapered surface section 21*f* is produced on the fore hook 21*b* side or on aft hook 21*c* side of the outer band section 21. Even if the tapered surface section 22*f* is formed in the base 22*a* of the inner band section 22 across the entire length in the blade width direction of the airfoil portion 20, a gap is similarly produced at a position of the inner surface 22*s* of the inner band section 22 due to the presence or absence of the tapered surface section 22*f*.

As described above, on the upstream side or downstream side of the flow of gas passing through the flow path 14, if a gap at a position in the blade-length direction (radial direction of the turbine shaft) of the airfoil portion 20 is produced in the inner surface 21*s* of the base 21*a* in the outer band section 21 or in the inner surface 22*s* of the base 22*a* in the inner band section 22 between the adjacent two turbine stator vanes 11, turbulence, such as whirlpool, due to the diffraction of a gas stream will be produced.

Figure 8A:
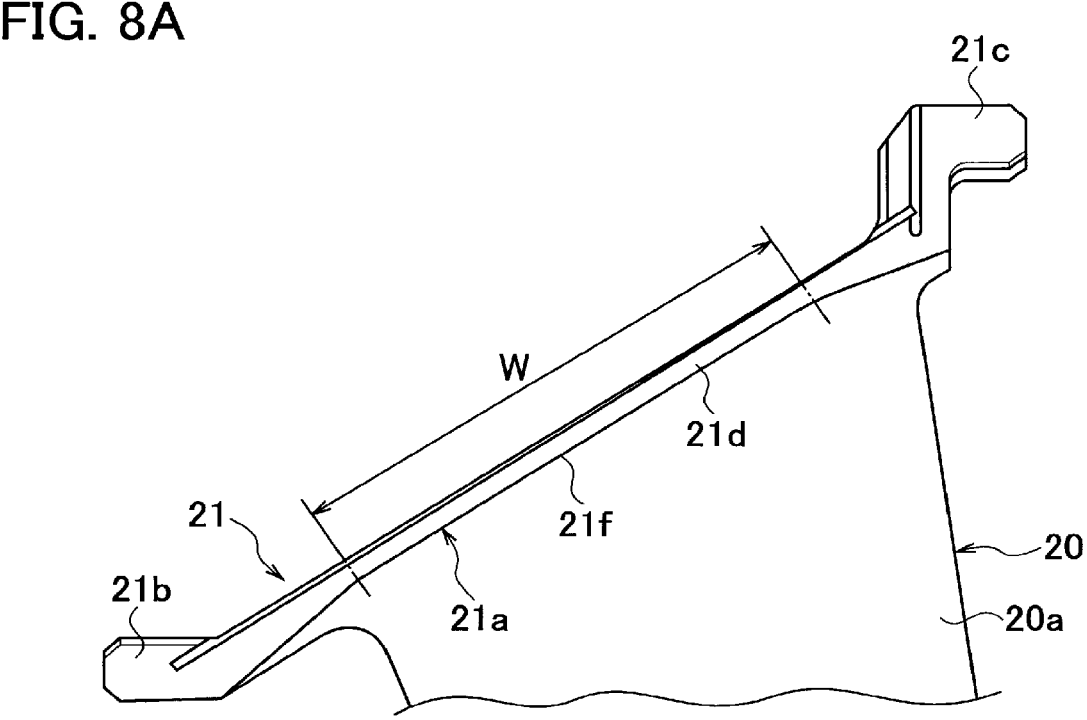
FIG. 8A and FIG. 8B illustrate an enlarged main portion of a turbine stator vane having a tapered surface section of FIG. 7A and FIG. 7B provided in a band section, where FIG.
Figure 8B:
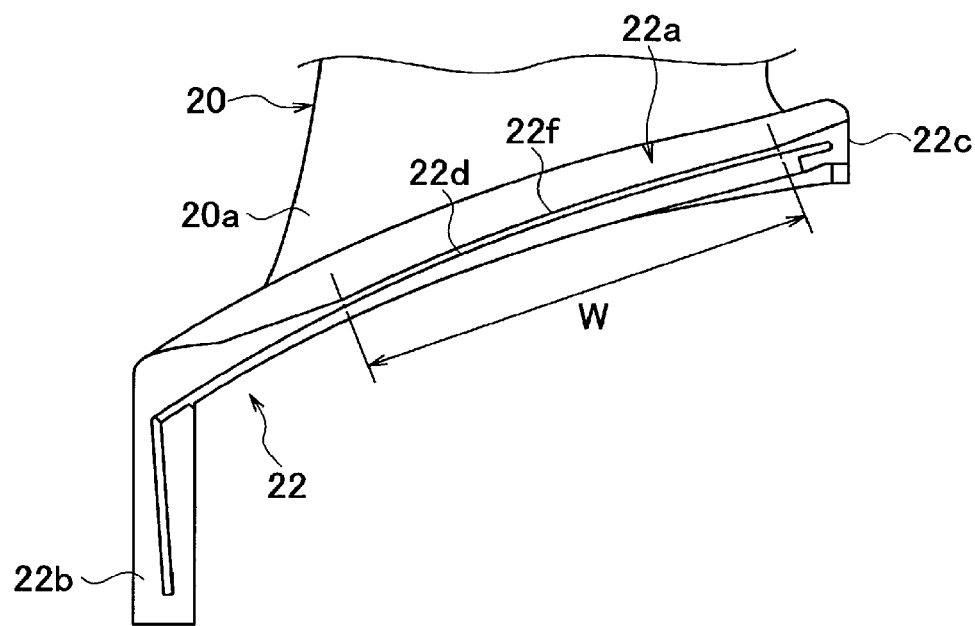

Then, a range, in which the tapered surface section 21*f* or 22*f* is formed in the inner surface 21*s* or 22*s* facing the flow path 14 of the base 21*a* or 22*a* of the outer band section 21 or inner band section 22, may be limited to a portion indicated by a range W in the view corresponding to the blade width of the airfoil portion 20, as illustrated by an enlarged main portion in the side views of FIG. 8A and FIG. 8B.

Thus, on the upstream side or downstream side of the flow of gas passing through the flow path 14, the tapered surface section 21*f* or 22*f* will not be formed in the inner surface 21*s* or 22*s* of the base 21*a* or 22*a* of the outer band section 21 or inner band section 22, so the position of the inner surface 21*s* or 22*s* of the base 21*a* or 22*a* in the outer band section 21 or inner band section 22 is aligned with each other between the turbine stator vanes 11, which are disposed adjacent to each other with a space S therebetween. Accordingly, a decrease in the turbine efficiency due to the turbulence of gas when the gas passes through the flow path 14 can be suppressed.

Moreover, in the embodiment described above, the inner seal 33 or outer seal 32 is abutted against the outer surface of the base 21*a* or 22*a* of the outer band section 21 or inner band section 22, but a locking groove locked by the end of the outer seal 32 or inner seal 33 may be formed in the outer surface of the base 21*a* or 22*a* of the outer band section 21 or inner band section 22.

Figure 9A:
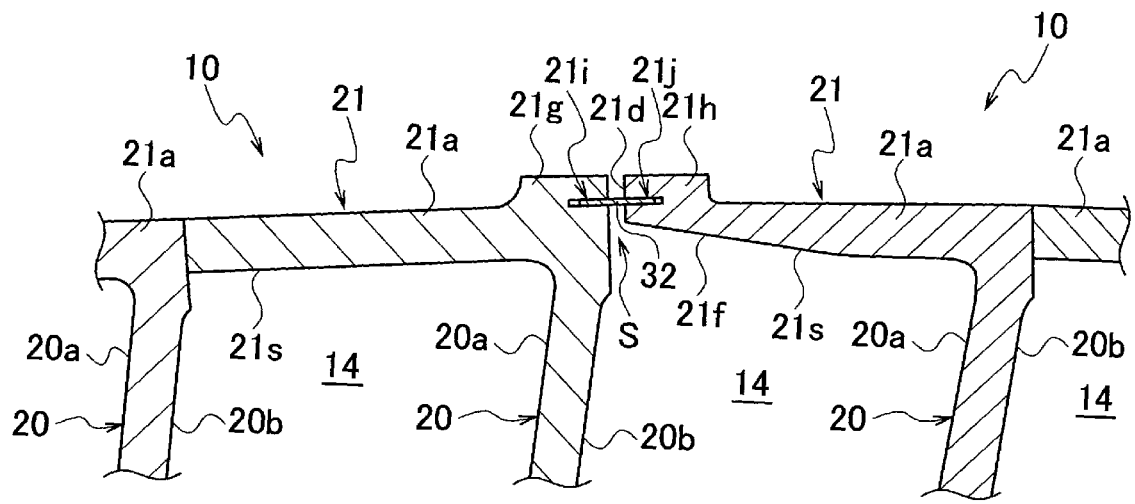
FIG. 9A and FIG. 9B illustrate an enlarged main portion of a sealing section between the vane segments constituting a turbine nozzle according to another embodiment of the present disclosure, where
Figure 9B:
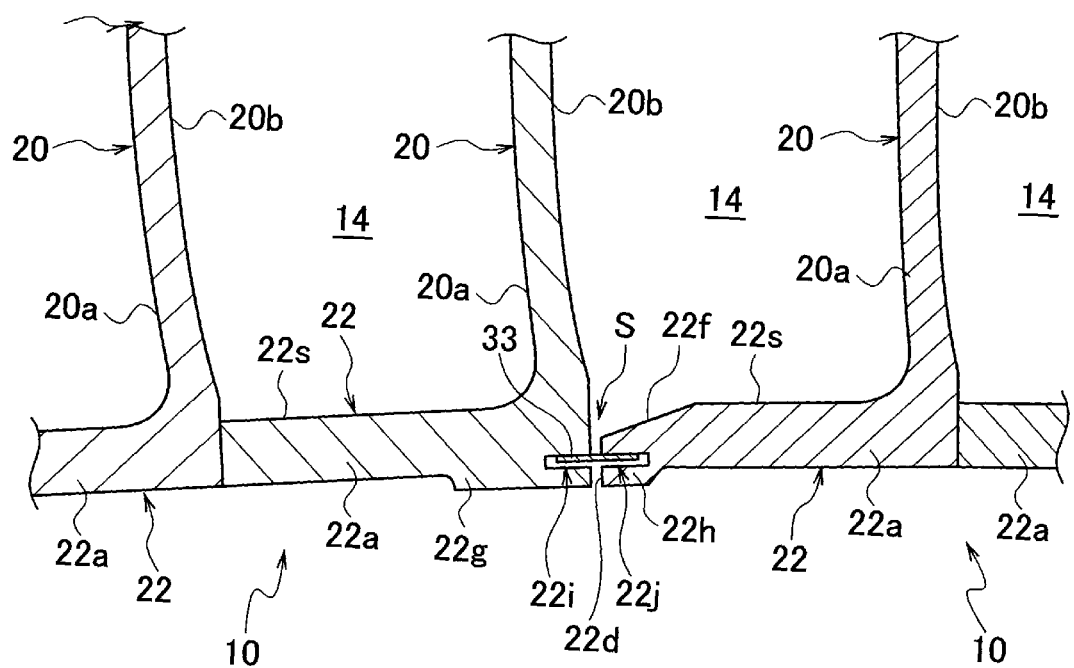

Specifically, for example as illustrated in the cross sectional views of FIG. 9A and FIG. 9B, a locking piece 21*g* or 21*h* is provided in the outer surface of the base 21*a* of the outer band section 21 of the turbine stator vane 11 located on the both sides of the space S, and a locking piece 22*g* or 22*h* is provided also in the outer surface of the base 22*a* of the inner band section 22 of each turbine stator vane 11.

Then, both ends of the outer seal 32 or inner seal 33 are inserted into a locking groove 21*i* or 21*j* formed from the outer surface of the base 21*a* of the outer band section 21 and the locking piece 21*g* or 21*h* and into a locking piece 22*i* or 22*j* formed from the outer surface of the base 22*a* of the inner band section 22 and the locking piece 22*g* or 22*h*.

Thus, the space S between the adjacent vane segments 10 can be appropriately plugged with the outer seal 32 or inner seal 33 by abutting the outer seal 32 or inner seal 33 against the outer surface of the base 21*a* or 22*a* of the outer band section 21 or inner band section 22 without depending on a suppress strength of the above-described hook seal 30 or a centrifugal force by the rotation of a turbine nozzle.

Moreover, a place, where the fiber formed of a CMC is cut off by the locking groove 22*i* or 22*j* and the continuity thereof is lost, is outside the outer surface of the base 21*a* or 22*a* of the outer band section 21 or inner band section 22. Therefore, the continuity of the fiber formed of a CMC in the base 21*a* or 22*a* will not be lost due to the presence of the locking piece 22*i* or 22*j*.

Accordingly, as with the turbine nozzle of the embodiment previously described, the base 21*a* or 22*a* of the outer band section 21 or inner band section 22 constituting the flow path 14 can have a structure having the strength obtained by a CMC.

Figure 10A:
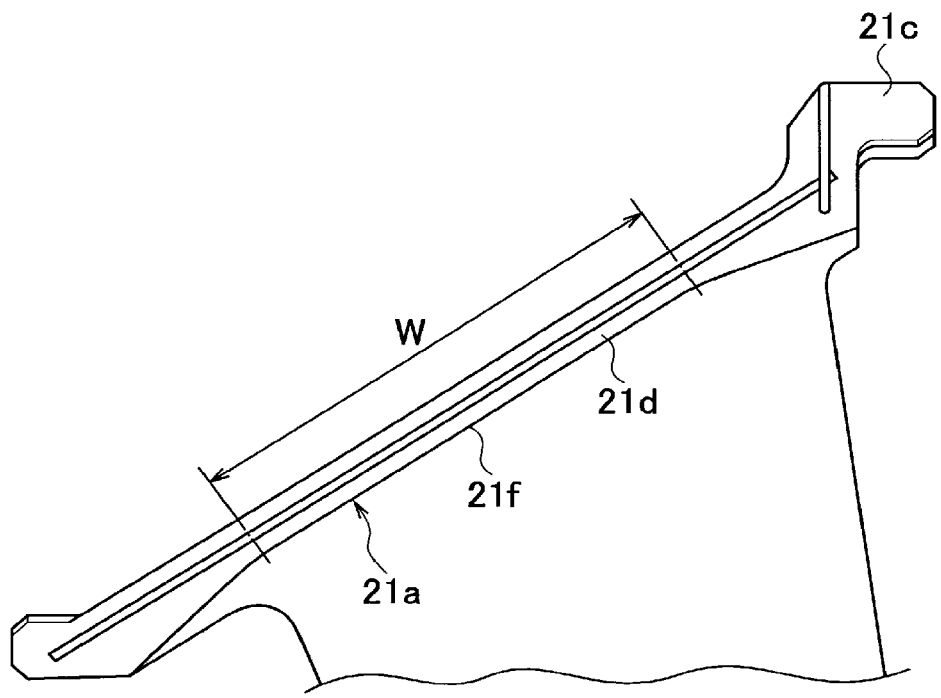
FIG. 10A and FIG. 10B illustrate an enlarged main portion of a turbine stator vane having the tapered surface section of FIG. 9 provided in the band section, where
Figure 10B:
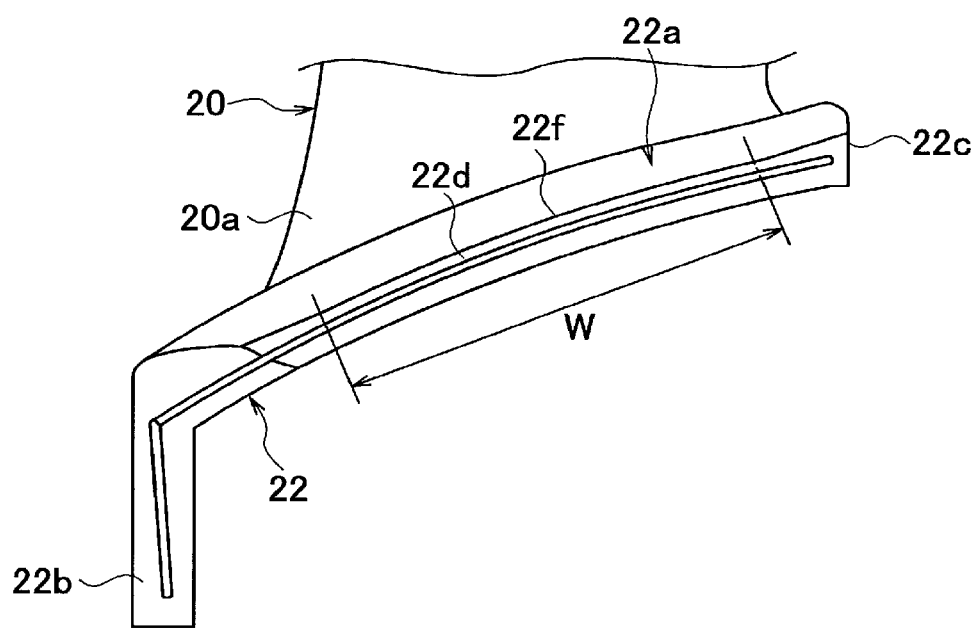

Note that, also in the present embodiment, a range, in which the tapered surface section 21*f* or 22*f* is formed in the inner surface 21*s* or 22*s* facing the flow path 14 of the base 21*a* or 22*a* of the outer band section 21 or inner band section 22, may be limited to a portion indicated by the range W in the view corresponding to the blade width of the airfoil portion 20, as illustrated by an enlarged main portion in the side views of FIG. 10A and FIG. 10B.

According to the present embodiment, a seal member attached across the outer surfaces of the band sections of adjacent two turbine stator vanes secures the airtightness of a flow path between the blades of the adjacent two turbine stator vanes, and excellently has the compression efficiency of gas obtained using a turbine nozzle.

Here, the space between the both band sections plugged with a seal member from the outer surface results in a dead space communicating with the flow path. However, by forming a thin-walled part in the inner surface of the one band section, the depth from the flow path of the space plugged with the seal member becomes thinner than the depth when the thin-walled part is not formed, i.e., than the thickness of a portion of the band section where the thin-walled part is not formed.

Accordingly, even without cutting off a fiber formed of a CMC in a portion close to the inner surface in the band sections of the adjacent two turbine stator vanes so as to form a depressed portion and without disposing a seal member for plugging the space between the band sections in a portion close to the inner surface of the band section, the dead space communicated with a flow path produced on the inner side of the seal member can be reduced to suppress a decrease in the compression efficiency of gas passing through the flow path.

Thus, when a turbine stator vane of a turbine nozzle of a gas turbine is formed of a CMC, a space between the band sections of two adjacent turbine stator vanes can be appropriately plugged without cutting off the fiber formed of the CMC.

Moreover, by inserting a seal member for sealing a space between both band sections into a locking groove of each band section, a seal member can be held in a state being abutted against the outer surface of each band section even without separately providing the configuration for pressing a seal member onto a band section from the outer side.

Furthermore, when a band section has a shape larger in the blade width direction than an airfoil portion, a thin-walled part will not be formed in the inner surface of the band section to the outer side in the blade width direction from the airfoil portion, so that on the upstream side or downstream side of the flow of gas passing through the flow path, the positions of the inner surfaces of the adjacent two band sections will be aligned with each other.

Therefore, a decrease in the compression efficiency of gas passing through the flow path can be suppressed on the upstream side or downstream side of the flow of gas passing through the flow path, while avoiding the generation of a gap at a position in the blade-length direction between the inner surfaces of the adjacent two band sections of the turbine nozzle and thus avoiding the generation of a turbulent flow due to the diffraction of a gas stream or the like.

This is the end of the description about the turbine nozzle according to the present disclosure, but the present disclosure is not limited to the above-described embodiments.

For example, in the above-described respective embodiments, in the inner surface facing the flow path 14 of the outer band section 21 or inner band section 22 of the turbine stator vane 11 located on the right side of the space S, the tapered surface section 21$f$ or 22$f$ which approaches the outer surface as extending toward a tip (i.e., toward the end face 21$d$ or 22$d$) is formed as a thin-walled part.

However, if the thickness between the outer surface and inner surface of the outer band section 21 or inner band section 22 is, at the tip of the outer band section 21 or inner band section 22, i.e., at the end surface 21$d$ or 22$d$, thinner than the bent section side connecting to the airfoil portion 20, a structure other than the tapered surface section 21$f$ or 22$f$, e.g., a depressed portion or the like, may be formed as the thin-walled part.

Moreover, in the above-described respective embodiments, a case, where the vane segments 10 including a plurality of turbine stator vanes 11 are connected to each other with the space S interposed therebetween, has been taken as an example and described. However, the present disclosure can be widely applicable, regardless of whether or not the vane segment 10 includes a plurality of turbine stator vanes 11, to the cases where at least some of a plurality of turbine stator vanes 11 are connected to each other with the space S interposed therebetween.

Furthermore, in the above-described respective embodiments, the turbine nozzle of a low pressure turbine of a jet engine has been taken as an example and described, but the present disclosure can be applied without being limited to the form and the like as long as a turbine nozzle is the one including a plurality of turbine stator vanes each formed of a CMC.

What is claimed is:

1. A turbine nozzle comprising:
    turbine stator vanes each including an airfoil portion, a bent section, and a band section connecting to the airfoil portion via the bent section, each of the turbine stator vanes being formed of ceramics combined with a fiber fabric, the fiber fabric being bent in a circumferential direction at an end of the fiber fabric to have a shape corresponding to the bent section and being integrally molded into a shapes corresponding to the airfoil portion and the band section connecting to the airfoil portion via the bent section, the airfoil portions of adjacent two of the turbine stator vanes forming a flow path of gas therebetween, and the band section of each of the turbine stator vanes including an inner surface facing the flow path and an outer surface opposite to the inner surface; and
    a seal member extending across a space between the bent section of a first turbine stator vane of the adjacent two of the turbine stator vanes, and a tip part of the band section of a second turbine stator vane of the adjacent two of the turbine stator vanes, wherein
    the tip part of the band section of the second turbine stator vane faces in the circumferential direction to the bent section of the first turbine stator vane,
    the inner surface of the band section of the second turbine stator vane includes a thin-thin wall part located on a tip part side of the inner surface, and
    a thickness between the inner surface and the outer surface of the band section of the second turbine stator vane smaller at the thin wall part than that at another part of the inner surface closer to the bent section than the thin wall part.

2. The turbine nozzle according to claim 1, wherein
    a first locking piece is provided on the outer surface of the band section of the first turbine stator vane to form a first locking groove between the first locking piece and the outer surface of the band sections of the first turbine stator vane, a second locking piece is provided on the outer surface of the band section of the second turbine stator vane to form a second locking groove between the second locking piece and the outer surface of the band sections of the second turbine stator vane, and
    the seal member is inserted into the first and second locking grooves.

3. The turbine nozzle according to claim 2, wherein
    the thin wall part is formed in a portion corresponding to a blade width of the airfoil portion in the inner surface.

4. The turbine nozzle according to claim 3, wherein
    the inner surface at the thin wall part is a tapered surface which approaches an outer-surface side as extending toward the tip part of the band section.

5. The turbine nozzle according to claim 4, wherein
    the first and second turbine stator vanes are respectively disposed in first and second stator vane segments so that the first and second turbine stator vanes are disposed adjacent to each other with the space therebetween.

6. The turbine nozzle according to claim 3, wherein
    the first and second turbine stator vanes are respectively disposed in first and second stator vane segments so that the first and second turbine stator vanes are disposed adjacent to each other with the space therebetween.

7. The turbine nozzle according to claim 2, wherein
    the inner surface at the thin wall part is a tapered surface which approaches an outer-surface side as extending toward the tip$_p$ of the band section.

8. The turbine nozzle according to claim 7, wherein
    the first and second turbine stator vanes are respectively disposed in first and second stator vane segments so that the first and second turbine stator vanes are disposed adjacent to each other with the space therebetween.

9. The turbine nozzle according to claim 2, wherein
    the first and second turbine stator vanes are respectively disposed in first and second stator vane segments so that the first and second turbine stator vanes are disposed adjacent to each other with the space therebetween.

10. The turbine nozzle according to claim 1, wherein the thin wall part is formed in a portion corresponding to a blade width of the airfoil portion in the inner surface.

11. The turbine nozzle according to claim 10, wherein the inner surface at the thin wall part is a tapered surface which approaches an outer-surface side as extending toward the tip part of the band section.

12. The turbine nozzle according to claim 11, wherein first and second turbine stator vanes are respectively disposed in first and second stator vane segments so that the first and second turbine stator vanes are disposed adjacent to each other with the space therebetween.

13. The turbine nozzle according to claim 10, wherein the first and second turbine stator vanes are respectively disposed in first and second stator vane segments so that the first and second turbine stator vanes are disposed adjacent to each other with the space therebetween.

14. The turbine nozzle according to claim 1, wherein the inner surface at the thin wall part is a tapered surface which approaches an outer-surface side as extending toward the tip part of the band section.

15. The turbine nozzle according to claim 14, wherein the first and second turbine stator vanes are respectively disposed in first and second stator vane segments so that the first and second turbine stator vanes are disposed adjacent to each other with the space therebetween.

16. The turbine nozzle according to claim 1, wherein the first and second turbine stator vanes are respectively disposed in first and second stator vane segments so that the first and second turbine stator vanes are disposed adjacent to each other with the space therebetween.

\* \* \* \* \*